United States Patent
Friedrich et al.

Patent Number: 5,743,554
Date of Patent: Apr. 28, 1998

[54] AIRBAG ARRANGEMENT

[75] Inventors: Matthias Friedrich, Hiddenhausen; Volkmar Wölfl, Vlotho, both of Germany

[73] Assignee: van Riesen GmbH u. Co. KG, Germany

[21] Appl. No.: 682,849

[22] Filed: Jul. 12, 1996

[30] Foreign Application Priority Data

Jul. 13, 1995 [DE] Germany ........................ 195 25 441.4

[51] Int. Cl.⁶ ........................................................ B60R 21/22
[52] U.S. Cl. ............................................ 280/730.1; 200/730.2
[58] Field of Search ................................. 280/730.1, 730.2

[56] References Cited

U.S. PATENT DOCUMENTS

| | | | |
|---|---|---|---|
| 2,861,626 | 11/1958 | Mills | 155/189 |
| 3,623,768 | 11/1971 | Capener et al. | 297/390 |
| 3,981,518 | 9/1976 | Pulling | 280/730.1 |
| 5,222,761 | 6/1993 | Kaji et al. | 280/730 |
| 5,312,131 | 5/1994 | Kitagawa et al. | 280/730.2 |
| 5,492,361 | 2/1996 | Kim | 280/730 |
| 5,511,850 | 4/1996 | Coursey | 280/730.1 |

FOREIGN PATENT DOCUMENTS

| | | |
|---|---|---|
| 2133239 | 10/1972 | France. |
| 2806548 | 8/1979 | Germany. |
| 9111206 | 2/1992 | Germany. |
| 9112752 | 2/1992 | Germany. |
| 4235324 | 4/1993 | Germany. |
| 9208309 | 12/1993 | Germany. |
| 9315509 | 3/1994 | Germany. |
| 9409377 | 9/1994 | Germany. |
| 4342959 | 6/1995 | Germany. |
| 29509136 | 9/1995 | Germany. |

*Primary Examiner*—Kenneth R. Rice
*Attorney, Agent, or Firm*—Jacox, Meckstroth & Jenkins

[57] ABSTRACT

There is disclosed an airbag arrangement for a vehicle seat, in particular for the rear seat of a motor vehicle. The airbag is so arranged laterally at the end of a carrier which is fastened on the side of the seat or of the back rest, that a person seated neighboring the carrier is essentially protected towards the front by the airbag. The carrier is pivotably mounted about an axis from a rest position into a working position and vise versa, this axis lying approximately parallel to a cutting axis formed between the seat surface and the back rest surface. The carrier together with airbag located thereon, in the rest position, lies in a recess in the seat surface or back rest surface, flushly closed with this surface.

7 Claims, 1 Drawing Sheet

AIRBAG ARRANGEMENT

BACKGROUND OF THE INVENTION

The invention relates to an airbag arrangement for a vehicle seat, in particular for the rear seat of a motor vehicle.

DESCRIPTION OF THE PRIOR ART

The application of airbags in vehicles is nowadays the state of the art. In practice, airbags have been successfully employed for the front seats, be it in steering wheel, in the dashboard and also at the sides. It has however been established that it is worthwhile to protect not only the front passengers, but also the rear passengers with airbag systems.

From DE-U-9111206 as well as DE-U-9315509 it is known to provide airbags for the front passengers as well as also for the rear passengers. The additional airbags described therein on the one hand serve as protection against a side impact and on the other hand serve also as protection against a front impact for the passengers located on the rear seats. The latter airbags are arranged in the region of the head supports of the front seats. However, this construction type is suitable for protecting the passengers located on the rear seats only under certain conditions. On the one hand there arises the problem of the correct arrangement with regard to height, particularly when, as usual, the front seats are adjustable in height and inclination, and on the other hand the problem of the constructional length of the vehicle. With vehicles having a large distance between the front and rear back rests, such airbags are not practical due to reasons of space. Furthermore there is the particular problem with such an airbag arrangement of reliably protecting children located in child seats, be they add-on child seats or integrated child seats.

From DE-U-9208309, although an airbag arrangement for an add-on child seat is known, this arrangement again is only suitable for the add-on child seat, not however for the normal vehicle seat. Moreover, the airbag described here has a potential danger since the upper side of the airbag arrangement may be used as a table for playing. Objects located thereon would be catapulted in a projectile manner in the case of a release, and this could lead to considerable injury to the child located in the child seat.

An airbag arrangement for a automobile child seat is disclosed in DE-U-29509136 in which the airbag is so mounted on one arm such that it lies in front of the child with regard the direction of travel. This arrangement too is suitable only for child seats and not for normal vehicle seats. With a corresponding airbag arrangement on usual automobile seats such an arrangement would be very handicapping since the seat would be only suitable for the transport of people and it suitablity would be very limited for the transport of goods. The airbag located above and in front of the seat would limit the use of space quite considerably.

SUMMARY OF THE INVENTION

Against this state of the art it is the object of the invention to provide an airbag arrangement for a vehicle seat, in particular the rear seat of a motor vehicle, which on the one hand, due to its positioning affords a good impact protection for the passengers of the vehicle, and on the other hand hinders as little as possible the loading of the vehicle. Furthermore the airbag arrangement is to be designed such that protection is afforded to the same degree for adults as well as children, be the child in the child seat or on an under-cushion.

According to the invention, this object is achieved by those features specified in claim 1. Accordingly the invention provides a lateral airbag arranged at the end of a carrier which is fastened on the side of the seat or the back rest, the airbag being arranged on the carrier such that a person seated neighbouring the carrier is essentially protected towards the front by the airbag. The carrier is then arranged pivotably mounted about an axis from a rest position into a working position and vice versa, the axis being approximately parallel to a cutting axis formed between the seat surface and the back rest surface. Furthermore, in the seat surface or the back rest surface a recess is provided, into which the airbag together with the carrier can be pivoted into the rest position in a manner such that airbag together with the carrier are flushly occluded with the seat surface and the back rest surface.

The invention therefore provides for an airbag arrangement which is particularly useful with regard to the positioning as well as loading aspects. The invention provides further for the first time, in the same manner, a good impact protection for children as well as adults, whereby due to the pivotability of the carrier and airbag into the seat surface or back rest surface, a loading possibility, as is with usual vehicle seats, results. The design construction is also simple, which is useful with regard to the cost of manufacture and to the reliability of the individual functional elements.

In particular, with the application of an add-on child seat it is useful either to design the airbag adjustable in height on the carrier, or alternatively to design the carrier itself adjustable in height, in order to optimally set the airbag to the size of the person to be protected and to his or her sitting position. This may be effected in a simple design manner in that, for example the airbag is fastened to a nut which runs on a spindle guided in the carrier, whereby the spindle may be rotated using a knurled screw on the end face. The airbag may then be continuously adjusted in height with regard to the carrier by way of this verticle adjusting system, whereby by way of the nut-spindle arrangement, there is always self locking, so that the restoring forces occuring in the case of a release may be securely accomodated.

In order to make possible an adjustment not only in height direction, but also in the direction transverse to this, i. e., to be able to set the distance between the airbag and the back rest surface, the carrier is advantageously designed adjustable in length.

In order to securely accomodate those restoring forces arising in the case of release, it is useful to design the carrier lockable in its working position. This may be effected in a simple manner by a mechanical positive locking securement, which preferably automatically latches, or alternatively electromechanically in combination with a corresponding logic switch.

If the airbag arrangement according to the invention is to be provided for the rear seat bench of a motor vehicle then it is preferably arranged in the manner of a center rest which can be pivoted in and out, whereby an airbag is then provided at both sides of the carrier, said airbag in each case protecting the person sitting to the left or to the right of the carrier. Both airbags may be adjustable in height independently from one another.

An even compacter construction results when not only the carrier can be pivoted into the seat surface or the back rest surface, but also the airbag or airbags. In this case also the airbags should also, where possible, be automatically locked in their pivoted-out position and only pivotable into the carrier by a directed operation of a lever or a button. Such an arrangement simplifies the getting in and getting out into and out of the seat respectively and allows, for example in the case of a one sided use of the seating, the full use of space on the other seating side, should the corresponding airbag be pivoted into the carrier.

If as in the preferred embodiment form, the carrier is to be pivotable into a recess of the seat surface or back rest surface as well as the airbags for their part being laterally pivotable into or out of the carrier, then a corresponding switch arrangement should be provided which ensures that the releasing impulse given out by the vehicle's own crash sensor is only further transmitted to the ignition charge of an airbag when it is ensured that on the one hand the carrier is located in the working position and on the other hand the respective airbag is pivoted out. Such a switch arrangment may be effected by corresponding switches at the joints, said switches being arranged in series. It is recommended to additionally provide a control diode which indicates the readiness to release the airbag.

BRIEF DESCRIPTION OF THE DRAWINGS

The invention is hereinafter described in more detail by way of the embodiment examples represented in the drawings. These show.

DETAILED DESCRIPTION OF THE PREFERRED EMBODIMENTS

Figure 1:
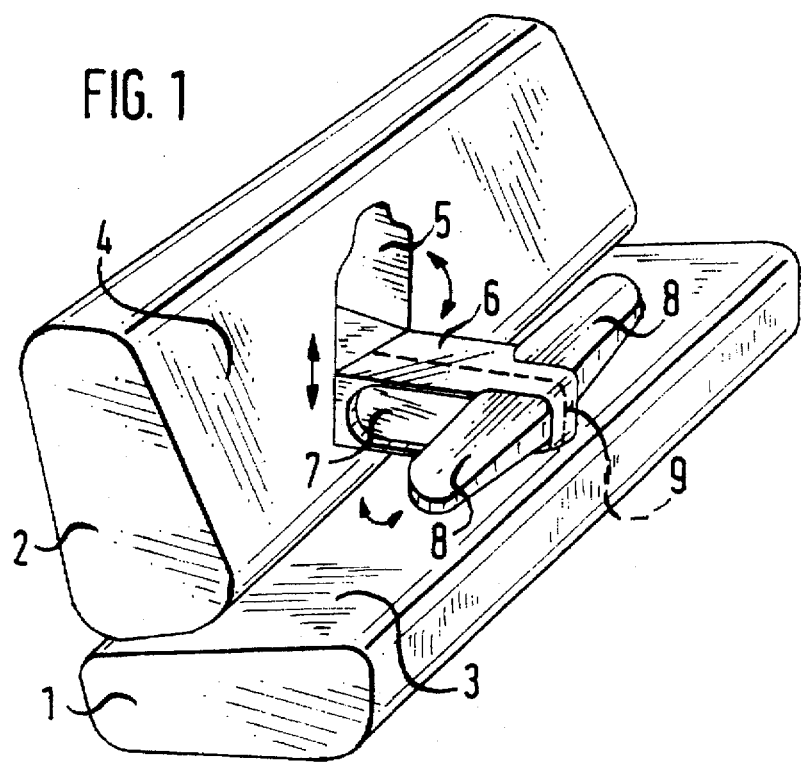
FIG. 1 a much simplified representation of a rear seat bench of a motor vehicle with the airbag arrangement according to the invention, represented in perspective and FIG. 2 an alternative arrangement, likewise represented in perspective.

The rear seat bench of a motor vehicle described by way of FIG. 1 comprises a seating cushion 1 as well as a back rest 2 which form a seat surface 3 and a back rest surface 4 for supporting one or more objects, a person or also a child seat. Otherwise, a child seat may be integrated in the back rest surface 4 or the seat surface 3, that is any location of the seating bench.

With the embodiment according to FIG. 1, roughly in the middle of the back rest 2 there is provided a recess 5 from which protrudes a carrier 6 which, for its part, comprises lateral recesses 7 from which the airbags 8 may be pivoted out. The figures show the airbags 8 in the pivoted-out position. At the foot of the recess 5 the carrier 6 is pivotably coupled to the back rest 2 and otherwise the carrier is arranged within the recess 5 to be adjustable in height, this being in latching steps. In this manner the airbags 8 laterally pivoted out at the end of the carrier 6 may be adjusted in height. This is particularly useful when child seats or so called boosters are used. In order to be able to adjust the height of the airbags 8 for the right and left seats independently from one another, the carrier 6 may be formed longitudinally parted, which is indicated in FIG. 1 by way of the dashed line 9, or alternatively two carriers 6 each with an airbag which may be laterally pivoted out may be provided.

In order to be able adjust the airbags 8 not only in the direction of height but also in their distance to the back rest surface 4, the carrier 6 is formed telescopical and longitudinally adjustable in steps or continuous. The accompanying adjusting device is so designed that in each position, a locking with a positive fit in the axial direction of the carrier 6 is secured, so that in the case of the release of the airbag the restoring forces may be securely accomodated.

Figure 2:
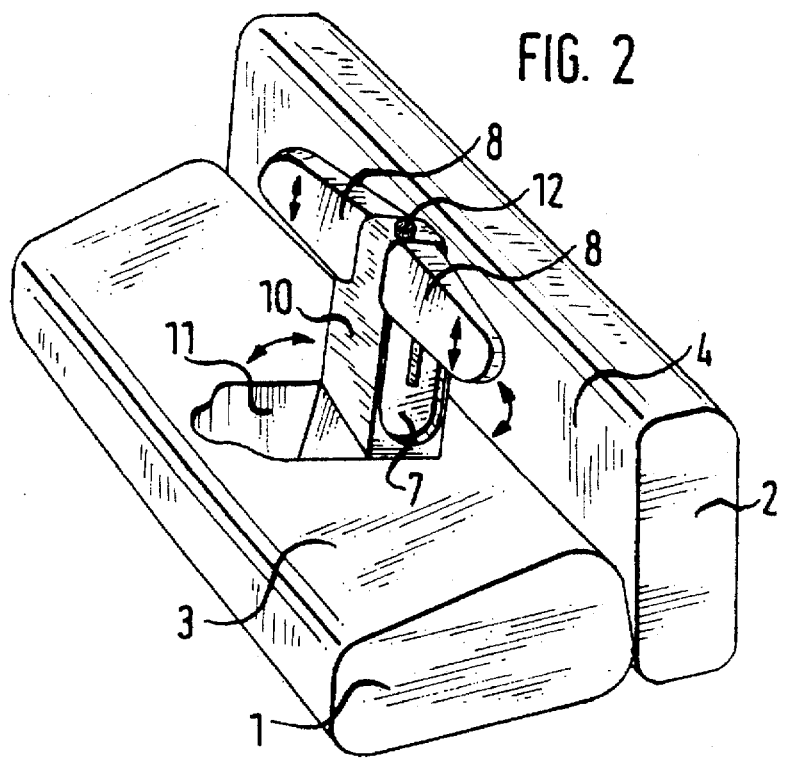

With the embodiment according to FIG. 2, a carrier 10 is provided which is similarly constructed to the carrier 6, and at its ends two airbags 8 are likewise arranged, able to be laterally pivoted out. Recesses 7 are also provided on the carrier 10, these recesses accomodating the airbags in the rest position. The carrier 10 itself is also pivotably mounted, this being about a pivoting axis which is parallel to a cutting axis formed between the seat surface 3 and the back rest surface 4. The carrier is linked in the base of a recess 11 in the carrying part of the seating cushion 1 and when the airbag 8 is pivoted in, the carrier may be pivoted in, flush with this cushion. In the working position shown in FIG. 2, the carrier 10 is locked, likewise the laterally pivoted-out airbags 8. A pivoting in is only possible after operating a safety button which is not shown.

The carrier 10 is not adjustable in height, but instead of this the airbags 8 can be height adjusted on the carrier 10. For this purpose a spindle is rotatably mounted within the carrier, said spindle extending in the longitudinal direction of the carrier, and the airbags 8 are supported at the spindle nut of the spindle. The spindle may be rotated by way of knurled wheel 12 arranged at the end of the carrier 10, by which means the airbags 8 are adjusted in height. In order to provide for a separate height adjustment of the left and the right airbags, either two separate carriers with individual adjustment may be provided or alternatively a common carrier with two spindles.

With both embodiments, microswitches are provided on the joints of the carrier 6 or the carrier 10 as well as on the joints between the carrier and the airbag, said microswitches only closing when the respective joint is in the working position, i.e. the carrier 6 is pivoted out of the back rest 2, or the carrier 10 is pivoted out of the seating cushion 1 and the airbags 8 are pivoted out of the recesses 7 and are locked in this working position. These microswitches are so arranged in series that the ignition impulse leaving the crash sensor of the vehicle is only transmitted further to the ignition charge located in the airbag 8 when the locked position as directed is achieved. When not in use, the airbags are pivoted into the recesses 7 of the carrier 6 or the carrier 10, after which the carrier 6 is pivoted into the recess 5 of the back rest 2, or the carrier 10 is pivoted into the recess 11 of the seating cushion 1. In this pivoted-in position (rest position), the carrier 6 is flushly occluded with the back rest surface 4, and the carrier 10 with the seat surface 3.

The airbags 8 are each so arranged laterally at the end of the carrier 6 or the carrier 10, that they afford protection, particularly towards the front, to the person sitting next to them, be this an adult or a child or also a child situated in a child seat. In the inflated condition the airbag therefore extends similar to an extended balloon mounted laterally on the carrier end.

With the embodiment according to FIG. 1, the carrier at the same time forms a middle arm rest. The airbags 8 are so formed with their outer contour that the laying down of objects thereupon is impossible, this being in order to prevent those objects thereupon from being hurled at high velocity.

What is claimed is:

1. An airbag arrangement for a vehicle seat of a motor vehicle, characterized in that an airbag is arranged at an end of a carrier fastened on a side of the vehicle seat or on a back rest surface of the vehicle seat such that a person seated neighbouring the carrier is essentially protected towards the front by the airbag, said carrier being pivotably mounted about an axis from a rest position into a working position and vice versa, said axis lying approximately parallel to a cutting axis formed between a seat surface and the back rest surface; and that the carrier together with airbag located thereon, in the rest position, lies in a recess in the seat surface or the back rest surface and is flushly occluded with this surface.

2. An airbag arrangement according to claim 1, characterized in that the carrier is lockable in its working position.

3. An airbag arrangement according to claim 1, characterized in that an airbag is arranged at both sides of the carrier.

4. An airbag arrangement according to claim 1, characterized in that an airbag is arranged at both sides of the carrier.

5. An airbag arrangement according to claim 1, characterized in that a switch is provided which, in the case of a vehicle collision, transmits the releasing impulse further to the propellant charge only then, when the carrier is locked in the working position and the airbag is situated in the pivoted-out, locked position.

6. An airbag arrangement for a vehicle seat of a motor vehicle, characterized in that an airbag is arranged at an end of a carrier fastened on a side of the vehicle seat or on a back rest surface of the vehicle seat such that a person seated neighbouring the carrier is essentially protected towards the front by the airbag, said carrier being pivotably mounted about an axis from a rest position into a working position and vice versa, said axis lying approximately parallel to a cutting axis formed between a seat surface and the back rest surface; and that the carrier together with airbag located thereon, in the rest position, lies in a recess in the seat surface or the back rest surface and is flushly occluded with this surface;

said airbag arrangement is characterized in that the airbag is adjustable in height in the carrier or the carrier itself is adjustable in height.

7. An airbag arrangement for a vehicle seat of a motor vehicle, characterized in that an airbag is arranged at an end of a carrier fastened on a side of the vehicle seat or on a back rest surface of the vehicle seat such that a person seated neighbouring the carrier is essentially protected towards the front by the airbag, said carrier being pivotably mounted about an axis from a rest position into a working position and vice versa, said axis lying approximately parallel to a cutting axis formed between a seat surface and the back rest surface; and that the carrier together with airbag located thereon, in the rest position, lies in a recess in the seat surface or the back rest surface and is flushly occluded with this surface.

said airbag arrangement is characterized in that the carrier is adjustable in length.

* * * * *